(12) United States Patent
Hsu et al.

(10) Patent No.: US 11,513,001 B2
(45) Date of Patent: Nov. 29, 2022

(54) LIGHT SENSOR MODULE INCLUDING A POLARIZING ELEMENT TO BLOCK DISPLAY LIGHT

(71) Applicant: SENSORTEK TECHNOLOGY CORP., Zhubei (TW)

(72) Inventors: Feng-Jung Hsu, Zhubei (TW); Tsung-Hua Wu, Zhubei (TW)

(73) Assignee: Sensortek Technology Corp., Jhubei (TW)

(*) Notice: Subject to any disclaimer, the term of this patent is extended or adjusted under 35 U.S.C. 154(b) by 0 days.

(21) Appl. No.: 17/082,373

(22) Filed: Oct. 28, 2020

(65) Prior Publication Data

US 2021/0285816 A1    Sep. 16, 2021

Related U.S. Application Data

(60) Provisional application No. 62/926,573, filed on Oct. 28, 2019.

(51) Int. Cl.
*G01J 1/42* (2006.01)
*G09G 3/34* (2006.01)

(52) U.S. Cl.
CPC .......... *G01J 1/4204* (2013.01); *G09G 3/3413* (2013.01); *G09G 3/3426* (2013.01)

(58) Field of Classification Search
None
See application file for complete search history.

(56) References Cited

U.S. PATENT DOCUMENTS

| 2014/0183342 A1* | 7/2014 | Shedletsky | H01L 51/5234 250/215 |
| 2018/0325397 A1* | 11/2018 | Presura | A61B 5/02255 |
| 2020/0105183 A1* | 4/2020 | Dodson | G02B 27/281 |

FOREIGN PATENT DOCUMENTS

| CN | 108422934 A | * | 8/2018 |
| CN | 111366242 A | * | 7/2020 |
| CN | 111366242 A |   | 7/2020 |
| TW | 201428950 A |   | 7/2014 |
| WO | 2017095896 A1 |   | 6/2017 |

OTHER PUBLICATIONS

Search Report Issued by Foreign Patent Office for Application No. 11020861000.
Examination Report Issued by Foreign Patent Office for Application No. 11020861000.

* cited by examiner

*Primary Examiner* — Kirk W Hermann
(74) *Attorney, Agent, or Firm* — Rosenberg, Klein & Lee

(57) ABSTRACT

A module comprises a display element, a first polarizing element, a light sensor, a transparent layer, and a second polarizing element. The display element emits a display light source. The first polarizing element covers the display element, and blocks a first phase portion of the display light source and allows a second phase portion of the display light source to penetrate. The transparent layer covers the first polarizing element. The light sensor is disposed on one side of the display element or the first polarizing element. The second polarizing element is disposed between the light sensor and the transparent layer and blocks a second phase portion of the display light source.

12 Claims, 3 Drawing Sheets

LIGHT SENSOR MODULE INCLUDING A POLARIZING ELEMENT TO BLOCK DISPLAY LIGHT

FIELD OF THE INVENTION

The present application generally relates to a light sensor module, and particularly to a module structure capable of suppressing stray light from entering a light sensor.

BACKGROUND OF THE INVENTION

Various modern electronic devices such as smartphones include many sensors, which are devices or components converting the ambient parameters of electronic devices or the motion track of smartphones into signals. These sensors include ambient light sensors, proximity sensors, gravity sensors, gyroscopes, compasses, Hall sensors, and pressure sensors.

Ambient light sensors are generally applied in adjusting the brightness of the display of electronic devices. If the ambient brightness is high, for example, under the sunlight, the brightness of the display of electronic devices will be raised correspondingly to show the content on the display clearly. On the contrary, if the ambient brightness is low, for example, in the dark night, the brightness of the display of electronic devices will be darkened to avoid glare and damage to the eyes due to mydriasis in the dark environment. Ambient light sensors can sense ambient brightness for adjusting the brightness of the display to an acceptable level for human eyes. This device can not only save energy and extend the lifetime of batteries but also providing a favorable user experience.

Of course, the ambient brightness sensed by ambient light sensors is not limited to the above application. For example, ambient light sensors can also be applied to cameras for performing white balancing. In addition, they can work with proximity sensors as mentioned above to sense if smartphones are placed in a user's pocket or backpack for preventing turning on of the display by accidental touches and waste of power source.

High-end smartphones are developed to utilize full-screen organic light-emitting diode (OLED) applications. Thereby, light sensors are generally disposed in the narrow rim of the screen. When an OLED panel is turned on, the display light source will be propagated in the glass lid and forming stray light. Stray light will make the background noise of light sensors larger and hence possibly making the sensing results of the ambient light sensors inaccurate. According to the prior art, ambient light sensors are disposed at a deeper location below the narrow rim of the screen. For example, the distance between the bottom surface of the glass lid and the top surface of the ambient light sensors is greater than 2.0 mm. Since the energy of light will be absorbed by the sidewall of the rim structure during the reflection process of stray light inside smartphones, the background noise of ambient light sensors will be lowered. Unfortunately, the ambient light will be degenerated before reaching the ambient light sensors. Hence, this method will lower the sensitivity of ambient light sensors.

Accordingly, how to block the stray light formed by the reflection of the display light source in the glass lid and thus reducing the background noise of ambient light sensors has become the major challenge in the field.

SUMMARY

An objective of the present application is to provide a light sensor module, in which a polarizing element is sandwiched between the transparent layer and the light sensor. By using the property that only the light with a single oscillating direction can penetrate the polarizing element, the stray light formed by the reflection from the transparent layer after the display element projects light to the transparent layer can be blocked and thus achieving the effect of reducing the background noise of the light sensing element.

To achieve the above objective, the present application provides a light sensor module comprising a display element, a first polarizing element, a transparent layer, a light sensor, and a second polarizing element. The display element emits a display light source. The first polarizing element covers the display element, and blocks a first phase portion of the display light source and allows a second phase portion of the display light source to penetrate. The transparent layer covers the first polarizing element. The light sensor is disposed on one side of the display element or the first polarizing element. The second polarizing element is disposed between the light sensor and the transparent layer and blocks a second phase portion of the display light source.

According to an embodiment of the present application, the second polarizing element blocks a second phase portion of an ambient light source and allows a first phase portion of the ambient light source to penetrate.

According to an embodiment of the present application, the light sensor includes a light sensing element, which senses the light intensity of the first phase portion of the ambient light source penetrating the second polarizing element.

According to an embodiment of the present application, the first polarizing element and the second polarizing element are linear polarizers, respectively, and the polarizing phase angles of the first polarizing element and the second polarizing element are different.

According to an embodiment of the present application, the polarizing phase angles of the first polarizing element and the second polarizing element differ by 90°.

According to an embodiment of the present application, a sheltering layer is disposed on the side of the first polarizing element adjacent to the light sensor.

According to an embodiment of the present application, the display element includes an OLED.

According to an embodiment of the present application, a sheltering device is disposed on the transparent layer and includes a hole for light to pass through.

According to an embodiment of the present application, the second polarizing element is disposed on the bottom surface of the transparent layer and opposing to the hole.

According to an embodiment of the present application, the light sensor includes an opening for light to pass through.

According to an embodiment of the present application, the second polarizing element is disposed on the top surface of the light sensor and opposing to the opening.

According to an embodiment of the present application, the light sensor module further comprises a substrate and the light sensor is disposed on the substrate.

To achieve the above objective, the present application provides a light sensor module disposed in an electronic device. The electronic device comprises a display panel. The display panel includes a display element, a first polarizing element, and a transparent layer. The first polarizing element covers the display element. The transparent layer covers the first polarizing element. The light sensor module comprises a light sensor and a second polarizing element. The light sensor is disposed on one side of the display element or the first polarizing element. The second polarizing element is disposed between the light sensor and the transparent layer. The first polarizing element and the second polarizing element are linear polarizers, respectively, and the polarizing phase angles of the first polarizing element and the second polarizing element are different.

According to an embodiment of the present application, the polarizing phase angles of the first polarizing element and the second polarizing element differ by 90°.

DETAILED DESCRIPTION

In order to make the structure and characteristics as well as the effectiveness of the present application to be further understood and recognized, the detailed description of the present application is provided as follows along with embodiments and accompanying figures.

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via another device or connecting means indirectly.

Figure 1:
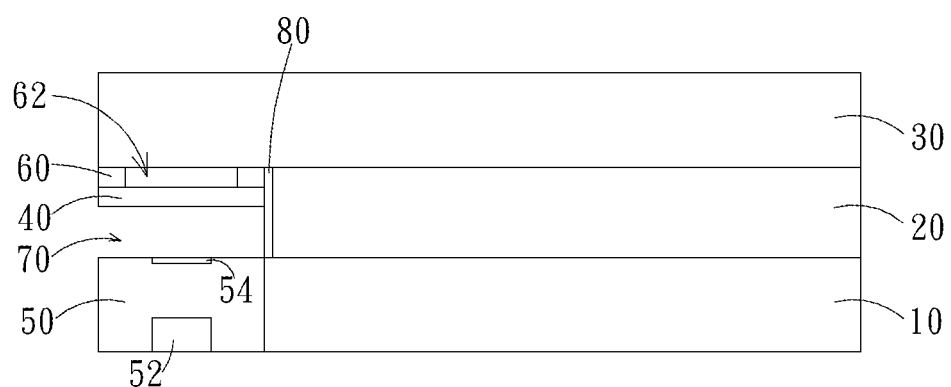
FIG. 1 shows a schematic diagram of the structure according to an embodiment of the present application.

Please refer to FIG. 1, which shows a schematic diagram of the structure according to an embodiment of the present application. As shown in the figure, the light sensor module according to an embodiment of the present application comprises a display element 10, a first polarizing element 20, a transparent layer 30, a second polarizing element 40, and a light sensor 50. The display element 10 emits a display light source. According to the present embodiment, the display element 10 includes an OLED. The first polarizing element 20 can be disposed on the display element 10 and covers the display element 10. The transparent layer 30 can be disposed on the display element 10 and covers the first polarizing element 20. The light sensor 50 is disposed on one side of the display element 10 or the first polarizing element 20. The transparent layer 30 shelters the light sensor 50. The second polarizing element 40 is disposed between the light sensor 50 and the transparent layer 30.

The first polarizing element 20 and the second polarizing element 40 are linear polarizers, respectively, and the polarizing phase angles of the first polarizing element 20 and the second polarizing element 40 are different. Accordingly, the first polarizing element 20 can block a first phase portion of light and the second polarizing element 40 can block a second phase portion of the light. According to the present embodiment, the polarizing phase angles of the first polarizing element 20 and the second polarizing element 40 differ by 90°. In other words, the first phase portion and the second phase portion described above differ by 90°, and hence the light passing through the first polarizing element 20 cannot pass through the second polarizing element 40.

The first phase portion of the display light source emitted by the display element 10 will be blocked by the first polarizing element 20 and only the second phase portion of the display light source L1 can pass through the first polarizing element 20. In addition, even though the component of the display light source passing through the first polarizing element 20 will be reflected within the electronic device such as a smartphone and forming the stray light L2, the stray light is still formed totally by the second phase portion. Accordingly, the second polarizing element 40 can block the second phase portions of the stray light L2 and the ambient light source effectively, and allow a first phase portion of the ambient light source L3 to penetrate and reach the light sensor 50. The ambient light source is the light source in the external environment, for example, the lamplight or the natural light.

Figure 2:
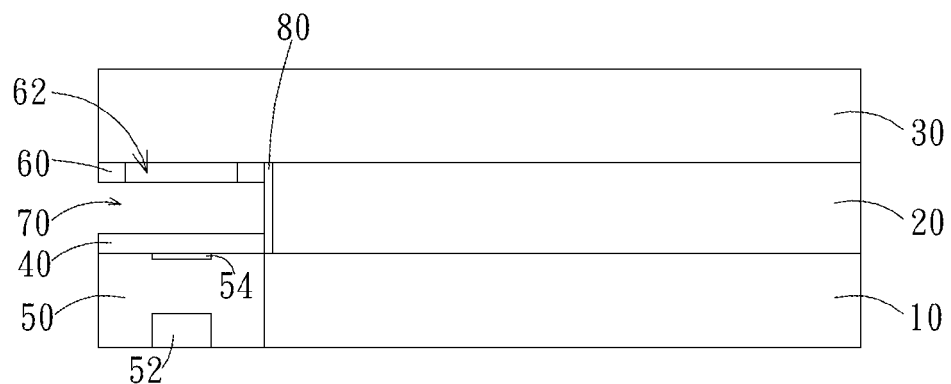
FIG. 2 shows a schematic diagram of another location of the second polarizing element according to an embodiment of the present application.

Moreover, the light sensor 50 includes a light sensing element 52, which can be a photodiode, for sensing the light intensity passing through the second polarizing element 40. Furthermore, according to the present embodiment, the second polarizing element 40 can be disposed on the bottom surface of the transparent layer 30. Thereby, an air layer 70 is further included between the second polarizing element 40 and the light sensor 50. Nonetheless, please refer to FIG. 2, which shows a schematic diagram of another location of the second polarizing element according to an embodiment of the present application. As shown in the figure, the second polarizing element 40 can be disposed on the top surface of the light sensor 50. Thereby, an air layer 70 is included between the transparent layer 30 and the second polarizing element 40.

Practically, the display element 10, the first polarizing element 20, and the transparent layer 30 can be the display panel of an electronic device such as a smartphone. As described above, the display element 10 includes an OLED; the transparent layer 30 can be the glass lid. Thereby, according to the present embodiment, the display element 10, the first polarizing element 20, and the transparent layer 30 form an OLED display panel. In general, the electronic device such as a smartphone will include a sheltering device 60 outside the display region of the transparent layer 30. The sheltering device 60 can be opaque ink and includes a hole 62, which is used for allowing the ambient light source or other light to pass through. The sheltering device 60 can shelter the light sensor 50 for avoiding the user from noticing the existence of the light sensor 50 using bare eyes.

Figure 3:
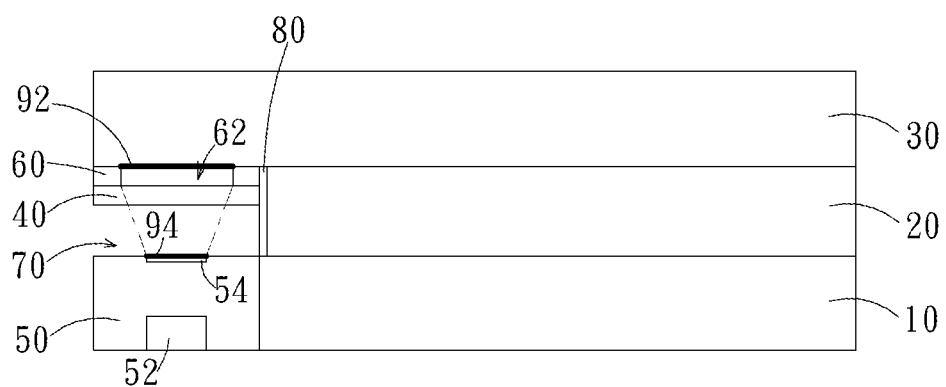
FIG. 3 shows a structural schematic diagram of the sheltering device corresponding to the opening of the light sensor according to an embodiment of the present application.

In addition, please refer to FIG. 3, which shows a structural schematic diagram of the sheltering device corresponding to the opening of the light sensor according to an embodiment of the present application. As shown in the figure, the light sensor 50 usually needs an opening 54 for the ambient light source or other light to pass through. Under a given light collecting angle, a first bore 92 of the hole 62 will be larger than a second bore 94 of the opening 54.

Accordingly, compared with disposing the second polarizing element 40 on the top surface of the light sensor 50 and opposing to the opening 54 of the light sensor 50, disposing the second polarizing element 40 on the bottom surface of the light sensor 50 and opposing to the hole 62 of the sheltering device 60 makes the fabrication and assembly of the overall structure simpler and less vulnerable to the influence of the tolerance in process or assembling. Nonetheless, according to some embodiments of the present application, the light sensing element 52 in the light sensor 50 can be packaged by transparent materials directly and no opening is required. In this case, disposing the second polarizing element 40 on the top surface of the light sensor 50 will be easier.

To facilitate understanding the present application, an example according to the prior art will be used for comparison. In general, the light sensing element 52 will receive two sets of light signals, including the stray light signals formed by the display light source and the signal of the ambient light source. The latter is the main signal for the light sensing element 52 for judging the ambient brightness while the former is formed by the display light source emitted by the display element 10, reflected within the electronic device such as a smartphone, and transmitted to the light sensing element 52. The stray light can be regarded as the source of an interference signal on the light sensing element 52, as shown in Equation (1) and (2) as follows, where $\text{Data}_{sensor}$ is the sensing signal value of the light sensing element 52; $1_{ambient\ light}$ is the signal value given by sensing the ambient light source; $D_{stray\ light}$ is the signal value given by sensing the stray light; $F_{calibration\ factor}$ is the luminance conversion coefficient; and lux is the luminance value of the ambient light source.

$$\text{Data}_{sensor} = D_{ambient\ light} + D_{stray\ light} \quad (1)$$

$$\text{lux} = \text{Data}_{sensor} \times F_{calibration\ factor} \quad (2)$$

Accordingly, in addition to receiving the ambient light source, the light sensing element 52 according to the prior art also receives the stray light formed by the display light source emitted by the display element 10. The stray light will increase the background noise of the light sensing element 52, making a correct judgement of the ambient brightness difficult.

Figure 4:
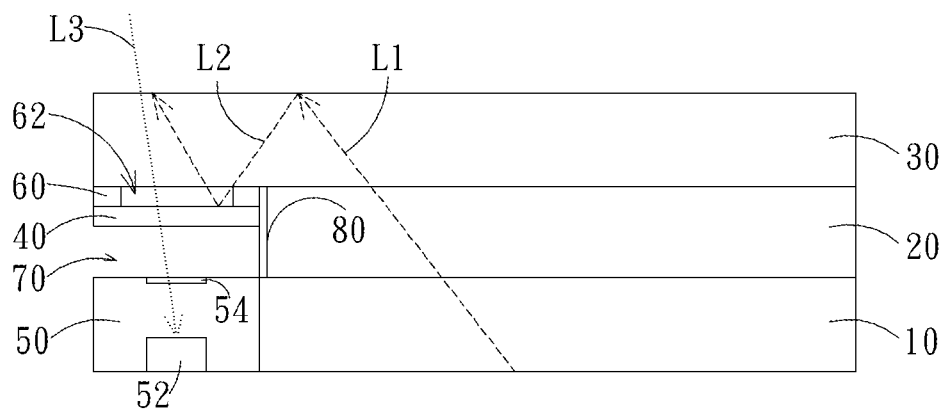
FIG. 4 shows a schematic diagram of the light reflection path according to an embodiment of the present application.

Please refer to FIG. 4, which shows a schematic diagram of the light reflection path according to an embodiment of the present application. As shown in the figure, when the signal of the display light source passes through the first polarizing element 20, only the second phase portion of the display light source L1 can penetrate. The light sensor module according to the embodiment of the present application comprises the second polarizing element 40 additionally. After adding the second polarizing element 40 between the transparent layer 30 and the light sensor 50, since the oscillating directions (the first and second phases) of the first polarizing element 20 and the second polarizing element 40 are different, the second phase portion of the display light source L1 passing through the first polarizing element 20 can be blocked effectively. In other words, the stray light L2 formed by the reflection of the display light source with an electronic device such as a smartphone is the second phase portion, making it difficult to pass through the second polarizing element 40 and influence the light sensing element 52. Hence, the accuracy of judging the ambient brightness can be improved effectively. When the polarizing phases of the first and second polarizing elements 20, 40 are perpendicular, the light sensor module according to the embodiment of the present application will not be influenced by the signal of the display light source. Thereby, it is not necessary to calculate the signal value given by the stray light described above, as shown in Equation (3) and (4) below:

$$\text{Data}_{sensor} = D_{ambient\ light} \quad (3)$$

$$\text{lux} = \text{Data}_{sensor} \times F_{calibration\ factor} \quad (4)$$

Accordingly, according to the present application, by using the property that polarizing elements allow light penetration only for a single oscillating direction (the first or second phase), the second polarizing element 40 blocks the display light source from entering the light sensor 50 by reflection and influencing the light sensing element 52. Thereby, the background noise of the light sensor 50 can be reduced substantially and avoid misjudging the ambient brightness.

It is noteworthy that according to some embodiments of the present application, to block the path of the display light source entering the light sensor 50 completely, a sheltering layer 80 can be disposed on one side of the first polarizing element 20 adjacent to the light sensor 50. The sheltering layer 80 can be opaque ink or other sheltering structures. Thereby, the sheltering layer 80 can further ensure that the display light source will not influence the light sensing element 52.

According to the prior art, the stray light formed by the screen of the electronic device such as a smartphone might increase the background noise of the light sensor. Consequently, the ambient light sensor is forced to be placed at a deeper location below the narrow rim, for example, the distance between the bottom surface of the glass lid and the top surface of the ambient light sensor is greater than 2.0 mm, for using the sidewall of the rim structure of the electronic device to absorb the stray light. Unfortunately, this method will lower the sensitivity of ambient light sensors.

Figure 5:
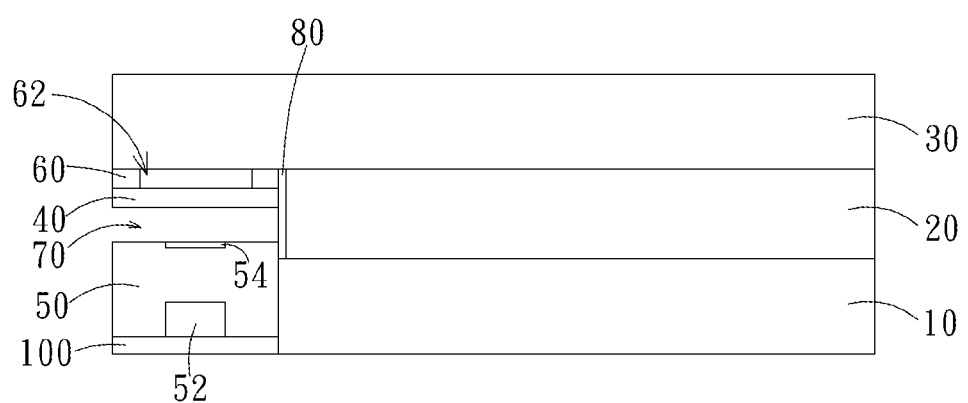
FIG. 5 shows a schematic diagram of the structure according to another embodiment of the present application.

Please refer to FIG. 5, which shows a schematic diagram of the structure according to another embodiment of the present application. The light sensor module according to the embodiment of the present application can block the stray light formed by the display light source and suppress the stray light from entering the light sensor 50. Thereby, as shown in the figure, the light sensor module according to the embodiment of the present application can dispose the light sensor 50 at a shallower location. For example, according to the present embodiment, the light sensor module can further comprise a substrate 100. By disposing the light sensor 5 on the substrate 100, the distance between the light sensor 50 and the transparent layer 30 can be shortened and enabling the light sensor 50 to be closer to the transparent layer 30. Since the light sensor module according to the embodiment of the present application can receive the ambient light better, the sensitivity of the light sensor 50 can be enhanced effectively. In other words, according to an embodiment of the present application, the distance between the light sensor 50 and the transparent layer 30 can be less than or equal to 2.0 mm, which is not achievable according to the prior art.

According to the above embodiment, the present application provides a light sensor module. The second polarizing element is sandwiched between the transparent layer and the light sensor. By using the property that only the light with a single oscillating direction can penetrate the polarizing element, the stray light formed by the reflection from the transparent layer after the display device projects light to the transparent layer can be blocked and thus achieving the effect of reducing the background noise of the light sensor.

The invention claimed is:

1. A light sensor module, comprising:
a display element, emitting a display light source;
a first polarizing element, covering said display element, and blocking a first phase portion of said display light source and allowing a second phase portion of said display light source to penetrate;
a transparent layer, covering said first polarizing element;
a sheltering layer disposed between the transparent layer and the display element;
a sheltering device that includes a hole disposed directly below the transparent layer;
a light sensor, disposed on one side of said display element;
a second polarizing element, disposed directly below the sheltering device, and blocking a second phase portion of said display light source;
an air layer disposed directly below the second polarizing element; and
an opening of the light sensor disposed directly below the air layer.

2. The light sensor module of claim 1, wherein said second polarizing element blocks a second phase portion of an ambient light source and allows a first phase portion of said ambient light source to penetrate.

3. The light sensor module of claim 2, wherein said light sensor includes a light sensing element, sensing a light intensity of said first phase portion of said ambient light source penetrating said second polarizing element.

4. The light sensor module of claim 1, wherein said first polarizing element and said second polarizing element are linear polarizers, respectively, and polarizing phase angles of said first polarizing element and said second polarizing element are different.

5. The light sensor module of claim 4, wherein the polarizing phase angles of said first polarizing element and said second polarizing element differ by 90°.

6. The light sensor module of claim 1, wherein the sheltering layer is disposed on the side of said first polarizing element adjacent to said light sensor.

7. The light sensor module of claim 1, wherein said display element includes an organic light-emitting diode.

8. The light sensor module of claim 1, wherein the sheltering device is disposed on said transparent layer and includes the hole providing light passing through there.

9. The light sensor module of claim 8, wherein said second polarizing element is disposed on a bottom surface of said transparent layer and opposing to said hole.

10. The light sensor module of claim 1, wherein said light sensor includes an opening for light to pass through.

11. The light sensor module of claim 10, wherein said second polarizing element is disposed on a top surface of said light sensor and opposing to said opening.

12. The light sensor module of claim 1, and further comprising a substrate with said light sensor disposed on said substrate.

* * * * *